United States Patent [19]

Spanel et al.

[11] E Re. 30,100

[45] Reissued Sep. 25, 1979

[54] YARN CONTROL AND FEEDING APPARATUS

[75] Inventors: Abram N. Spanel, 344 Stockton St., Princeton, N.J. 08540; David R. Jacobs, New Canaan, Conn.; David N. Buell, Littleton, Colo.

[73] Assignee: Abram N. Spanel, Princeton, N.J.

[21] Appl. No.: 880,813

[22] Filed: Feb. 23, 1978

Related U.S. Patent Documents

Reissue of:

[64] Patent No.: 3,937,160
Issued: Feb. 10, 1976
Appl. No.: 578,209
Filed: May 16, 1975

[51] Int. Cl.[2] ..... D05C 15/18
[52] U.S. Cl. ..... 112/79 FF; 226/97
[58] Field of Search ..... 112/79 R, 79 A, 79 FF, 112/78; 226/97

[56] References Cited

U.S. PATENT DOCUMENTS

| | | | |
|---|---|---|---|
| Re. 27,165 | 8/1971 | Spanel et al. | 112/79 R |
| 3,554,147 | 1/1971 | Spanel | 112/79 R |
| 3,595,186 | 7/1971 | Shorrock | 112/79 R |
| 3,824,939 | 7/1974 | Spanel et al. | 112/79 FF |

FOREIGN PATENT DOCUMENTS

| | | | |
|---|---|---|---|
| 1318226 | 5/1973 | United Kingdom | 112/79 R |
| 1323264 | 7/1973 | United Kingdom | 112/79 R |

*Primary Examiner*—H. Hampton Hunter
*Attorney, Agent, or Firm*—Steele, Gould & Fried

[57] ABSTRACT

A yarn control and feeding apparatus for use with tufting machines and similar apparatus wherein yarn, normally precut, is tufted into a backing layer. A pulsing-type solenoid actuator is utilized to selectively control yarn metering and feeding functions carried out by a rotatable yarn feed wheel and to further control pneumatic yarn transport means including advancing and retracting yarn during various stages of the tufting cycle.

24 Claims, 12 Drawing Figures

YARN CONTROL AND FEEDING APPARATUS

Matter enclosed in heavy brackets [ ] appears in the original patent but forms no part of this reissue specification; matter printed in italics indicates the additions made by reissue.

BACKGROUND OF THE INVENTION

The subject application [disclosed] *discloses* yarn control and feeding apparatus in which concepts from tufting procedures which have become known as the "Spanel tufting system" are utilized. Generally, the Spanel system utilizes pneumatic means to transport yarn to a tufting station, either in metered lengths of unsevered yarn or in discrete bits, after which time the yarn is tufted, by needles or other bit-applying elements to a backing layer to form a tufted product such as a rug.

The present invention discloses yarn control and feeding apparatus which, in some respects, operationally improves embodiments of early Spanel patents, including U.S. Pat. No. 3,554,147, which issued to Abram N. Spanel and George J. Brennan on Jan. 12, 1971, and U.S. Pat. No. Re. 27,165, which issued Aug. 10, 1971 to Abram N. Spanel and Lloyd E. Barton.

The aforementioned U.S. Pat. No. Re. 27,165 discloses a pneumatic yarn transport system having multicolor selection capability in which yarn strands and/or discrete bits of yarn are transported pneumatically to a tufting station where they are applied by tufting elements to a backing layer. The aforementioned U.S. Pat. No. 3,554,147 describes an alternative system to U.S. Pat. No. Re. 27,165, and provides for the simultaneous selection of bit-lengths of yarn of various colors for each tufting cycle at each individual tufting station. A collator structure in which individual channels transport yarn into a common passageway adjacent the tufting station is utilized. The capability of severing a bit-length of yarn before, during or after threading of the tufting element and before or during actual tufting is disclosed.

In addition to the above Spanel patents, co-pending Spanel Application Ser. No. 419,417 discloses a tufting device which utilizes a cutting arrangement employing an axially reciprocable passageway section to provide access for yarn severing means to sever the yarn into selectively sized yarn bits. In addition, co-pending Spanel Application Ser. No. 474,264 discloses a tufting machine which includes a rotatable yarn feed having modified driving and brake means engageable with said rotatable yarn feed means. A pneumatic yarn transport means is provided which includes selective control of gas flow for transporting metered lengths of yarn to a tufting station for severance into yarn bits and subsequent implantation into a backing. As in U.S. Pat. No. 3,554,147, a collator structure is utilized which leads into a common passageway adjacent the tufting station. A yarn pullback or retraction means for retracting yarn from the common passageway is disclosed which will cause only minimal yarn deformation during operation. The pullback function is necessary to remove a particular yarn strand from the common passageway after a yarn bit has been severed therefrom for tufting. This is to enable the advancing of another yarn strand of a different color to the tufting station to supply a yarn bit for the next cycle.

In addition to the above Spanel patents, U.S. Pat. No. 3,824,939 and co-pending Spanel Application Ser. Nos. 419,417, 474,465 and 474,266 all disclose various aspects of Spanel tufting techniques.

BRIEF SUMMARY OF THE INVENTION

In accordance with the subject invention, the apparatus disclosed herein utilizes a yarn control metering and feeding system which utilizes a unique type of actuator and selection means which is actuated by pulsed solenoid means. Basically, the invention sets forth a means by which yarn strands of different colors are selected for and transported to stations with a multiplicity of strands being selectable for each tufting station. The subject invention is directed to yarn control and feeding apparatus and, accordingly, other aspects of Spanel tufting techniques as disclosed in other Spanel patents and applications will not be shown and discussed in detail. It is to be understood that a collator structure such as disclosed in Spanel U.S. Pat. No. 3,554,147 may be utilized which includes a common throat into which a series of yarn tubes merge to provide yarn to tufting needles such as shown in Spanel U.S. Pat. No. 3,554,147.

The subject disclosure utilizes a selector means which engages a key element of a selector plunger for each unit, the key element being actuated by an actuator element responsive to pulsed solenoid means. The selector means provides the drive for each individual selector plunger and upon the actuation of a desired unit, a rotatable yarn feed wheel is released to provide a metered length of yarn. This is accomplished by securing engagement between feed wheel elements and a drive shaft which is separate from the selector means. Simultaneously, as the yarn feeding takes place, the pneumatic system comprising pneumatic yarn advancing and pullback means is actuated by the selector plunger to first feed a selective length of yarn into the common throat area and to the tufting station, and secondly, after severance of a bit-length of yarn from the selected yarn strand to withdraw the yarn clear of the common throat to permit passage of the next selected yarn strand.

DETAILED DESCRIPTION

Figures 1, 2:
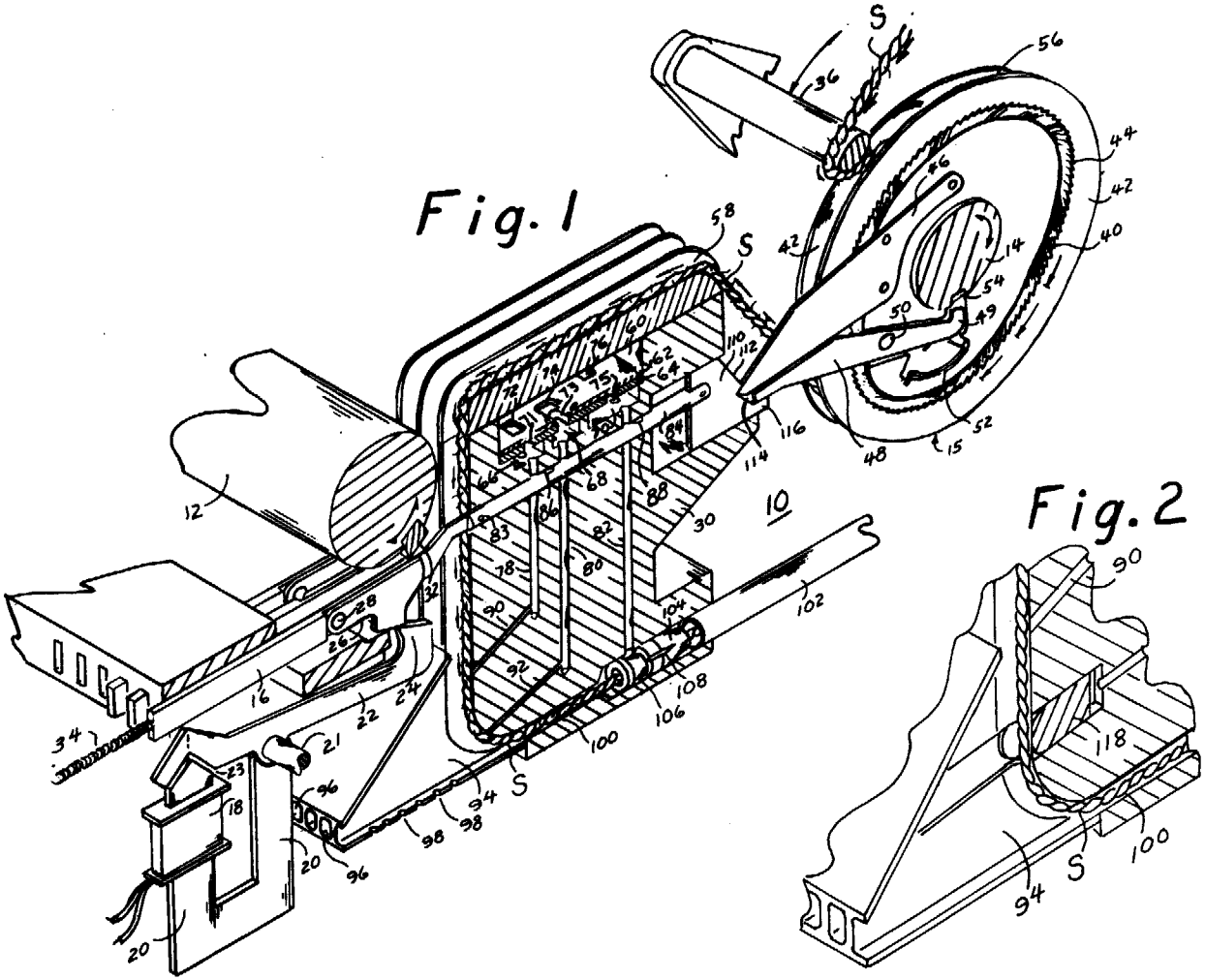
FIG. 1 discloses a perspective view of the yarn control and feeding apparatus.
FIG. 2 discloses a modified yarn pullback device which may be utilized in the apparatus of FIG. 1.

With reference to FIG. 1, the illustrated yarn selection and feeding unit 10 has two primary shafts which are utilized to drive various major elements of the system. A selector shaft 12 is utilized in the yarn selection process and a drive shaft 14 is utilized to drive yarn feed wheel 15. Both of the shaft units 12 and 14 [are in constant oscillating rocking motion] *oscillate during each machine cycle* and when viewed with relation to each individual unit 10, these and air valve plate 62 are the only elements moving when a particular yarn has not been selected. For each tufting needle (See FIG. 11), there may be a multiplicity of tufting selection and feeding units 10 which may be conveniently positioned in tiers. The selector and drive shafts 12 and 14 may extend across the width of the tufting machine and, accordingly, provide drive for all units of a particular tier.

When a particular yarn strand is called for as, for example, the yarn strands shown in subject unit 10 of FIG. 1, selector plunger 16 is actuated as follows. A solenoid 18 is shown mounted on the left leg of magnetic core member 20 while the right leg is near but not [toughing] *touching* actuator 22 which is pivotally mounted on shaft 21. As shown, the left end of actuator 22 is closely positioned above solenoid 18 so that only a slight air gap 23 is found between the top of the magnetic core member 20 and the actuator 22. The end of actuator 22, remote from the solenoid 18, terminates in an upturned tab 24. Above the upturned tab 24 is a selector key 26 pivotally secured to selector plunger 16 by means of connecting pin 28. The selector plunger 16 extends to the right into selector body 30, in which the pneumatic apparatus of the system is contained, and, through intermediate elements, controls the operation of yarn feed wheel 15 to the right of selector body 30. Spring 34 engages the lefthand end of selector plunger 16 and biases the plunger to the right.

When solenoid 18 is energized, the actuator tab 24 impacts against selector key 26 causing its free end to pivot upwardly where it can be engaged by cam lobe 32 that extends along the length of selector shaft 12. As the shaft 12 rocks in a clockwise direction, the selector key 26 and selector plunger 16 are driven to the left causing actuation of the pneumatic system and feed system as will be described.

Yarn strand S can be seen extending downwardly from a yarn creel (not shown) over a prefeed bar 36 which oscillates in timed relation with the drive shaft 14 and the selector shaft 12 to the feed wheel 15 elements of which are positioned around drive shaft 14. Drive disc 38 has the drive shaft 14 extending through its center and has mounted on its outer surface an engaging substance 40, such as Fibertran produced by the 3M Company. Around the outside perimeter of the drive disc 38 is a feed rim 42 that has clutch teeth 44 around its inside surface. The combination clutch teeth 44 and Fibertran fibers provide a one-way clutch to prevent slippage between drive disc 38 and feed rim 42. It is to be understood that any type of one-way clutch may be used in place of the type shown. Mounted to the drive disc 38 is a rigidly secured cam and lock arm 46 under which is an engaging member 48 pivotally secured to drive disc 38 by means of pin 50. The right hand end of engaging member 48, which terminates in key 49, is biased by key spring 52 to an upward position where the key 49 will engage key slot 54 of drive shaft 14 until the spring bias is overcome. Yarn strand S from the creel (not shown) travels over prefeed bar 36 into yarn guide groove 56 formed within bifurcated feed rim 42 and extends around yarn feed wheel 15 and upwardly into the aligned yarn guide channel 58 positioned on the top and left side of selector body 30.

The selector body 30 contains an air manifold 60 below which air valve structure comprises upper air valve plate 62 which is slideably placed upon lower valve plate 64 which is stationary. Air chambers 66, 68 and 70 are found below air valve plates 62 and 64, and it will be noted that air valve plate 62 has air ports 72, 74 and 76 which permit air to be supplied from manifold 60 to the lower chambers 66, 68 and 70 through air ports 71, 73, 75, respectively, as permitted by the cycling of air valve plate 62. It will be noted that air can always flow into the middle chamber 68 through ports 73 and 74 because of the configuration of port 74 which, unlike ports 72 and 76, extends a sufficient distance widthwise to always permit air flow through port 73. Below chambers 66, 68 and 70, a prefeed air channel 78, a pullback air channel 80 and a primary feed air channel 82 extend downwardly from chambers 66, 68 and 70, respectively.

It can be seen that selector plunger 16 extends to the selector body 30 where it is rigidly secured by pin 83 to a cylindrical valve stem 84 that bisects the prefeed, pullback and primary feed air channels 78, 80 and 82, respectively. The valve stem 84 includes vertical ports 86 and 88 which extend through valve stem 84 so that when the port 86 is aligned with either prefeed air channel 78 or pullback air channel 80, or when port 88 is aligned with primary feed air channel 82, air may pass downwardly from the respective chambers 66, 68 and 70.

The prefeed channel 78 and the pullback channel 80 are shown extending by means of angular extension channels 90 and 92 to points of intersection with yarn guide channel 58 along the lower lefthand side of selector body 30. In the proximity of the angular extensions 90 and 92, a prefeed and pullback storage pocket 94 is located to the outside of the yarn guide channel 58. Side air vents 96 and base air vents 98 are disclosed to permit the passage of air from the system. It will be seen that the yarn guide channel 58 leads into enclosed passageway 100 at the base of the selector body 30 and that to the right of this enclosed yarn passageways 100 is a yarn tube 102. The yarn tube 102 from each unit extends into a common throat (See FIG. 11) adjacent tufting needles (See FIG. 11) as disclosed in Spanel U.S. Pat. No. 3,554,147 and co-pending Spanel Application Ser. No. 474,264. A Venturi-like nozzle 104 is disclosed in the cutaway area adjacent to which is an air chamber 106 into which air flow from the primary feed air channel 82 is received. Outer air passageways 108 within the yarn tube 102 permit air to pass from chamber 106 over nozzle 104 and into unobstructed yarn tube 102 to propel the yarn to the right through the yarn tube 102 to the tufting station (See FIG. 11).

The far right end of valve stem 84 is secured to cam plate 110 which is laterally shiftable along with selector plunger 16 and valve stem 84 and is engageable with cam and lock arm 46. A camming surface 112 is provided, below which is a recessed area 114 which extends downwardly and terminates in a release tab 116.

As can be seen in FIG. 1, when cam plate 110 shifts to the left, engaging member 48 will drop as it effectively is released by release tab 116, thus causing the engaging member 48 to be biased by key spring 52 into engagement with drive shaft 14. It will also be appreciated that cam and lock arm 46 can urge cam plate 110 to the left as the cam and lock arm 46 swings through a downward arc with its left extremity engaging camming surface 112.

The operation of each of the above described yarn selection units 10 is as follows. As soon as a pulse is given for the selection of a particular yarn strand S, the selection elements are energized by means of solenoid 18. The magnetic attraction from the solenoid magnetic core member 20 attracts the actuator 22 and closes the air gap between the lefthand end of the actuator 22 and the top of the lefthand side of the member 20. As this happens, the righthand tab 24 of the actuator 22 impacts against the bottom of selector key 26 and urges it upwardly toward the selector shaft 12. As seen in FIG. 1, movement of the selector key 26 is limited by the cam lobe 32. As the selector shaft 12 rocks in a counterclockwise direction to a load position, the cam lobe 32 will clear the end of the selector key 26 allowing the selector key to reach its upward position. Effectively, the selector shaft 12 now has the selector key 26 engaged by the cam lobe 32 and when the selector shaft 12 rotates in a clockwise direction, the selector key 26 together with the selector plunger 16 are moved leftwardly. As the selector key 26 reaches its furthest possible position to the left, the tab 24 of actuator 22, which is still being urged upwardly, will pop up to its uppermost position when the base of the selector key 26 slides sufficiently far to the left. As this happens, a mechanical clip is formed between the base of the selector key 26 and the actuator tab 24. This enables actuation to consist of pulsing the solenoid 18 with, for example, a high voltage pulse which need be only for an extremely short interval of time, such as ten milliseconds. A much smaller voltage may be used for part of the cycle and the voltage turned off for the rest of the cycle since the mechanical engagement between selector key 26 and actuator tab 24 secures the selector key 26 to the left in its desired position.

Using a high voltage pulse is further desirable since the pull of a solenoid varies nonlinearly with the gap distance, and the greatest pull is required when the gap is largest. Accordingly, the gap is closed instantly, and this condition can then be maintained by a very small voltage.

As the selector key 26 is driven to the left, the selector plunger 16 and the valve stem 84 are also driven to the left overcoming the bias of spring 34. This serves to bring valve ports 86 and 88 in line with prefeed air channel 78 and primary feed channel 82, respectively, so that as air is admitted to chambers 66 and 70, the air pressure will continue down through channels 78 and 82, respectively. Thus, as upper air valve plate 62 oscillates, its air ports 72 and 76 will be in and out of alignment with air ports 71 and 75 in the lower valve plate 64 to provide quick bursts of air through to the prefeed air channel 78 and the primary feed air channel 82, respectively. As can be seen from the positioning of the ports 72 and 76 of the upper air valve plate 62, the air bursts to the two respective chambers below will be at slightly different times. Accordingly, when the selector mechanism 16 and valve stem 84 move to the left, the ports 86 and 88 permit the quick bursts of air which are necessary to the prefeed and primary feed yarn cycles as will be discussed. As will be described in more detail when the sequential views in FIGS. 3 through 11 are discussed, air is introduced into yarn guide channel 58 from prefeed air channel 78 to propel the yarn strand S into the prefeed and pullback storage pocket 94 as the yarn is released from the rotatable yarn feed system. Once the yarn strand S has been fed into the prefeed and pullback storage pocket 94, it may then be advanced to the needles (not shown) by air from the primary feed air channel 82 which feeds into the yarn tube 102 through Venturi-like nozzle structure 104.

As the selector plunger 16 and the valve stem 84 are moved to the left, as above discussed, cam plate 110, which is rigidly secured to the end of the valve stem 84, also moves leftwardly and as it does, the lefthand end of engaging member 48 drops and it is released from its position on top of the release tap 116. As this release occurs, the engaging member 48 pivots around pin 50, as the righthand end key 49 of the engaging member 48 is urged upwardly by means of key spring 52. It has been previously noted that drive shaft 14 constantly oscillates in a rocking motion. The distance of the motion may be adjustable to determine the length of yarn that will be fed. This adjustment may be made by an adjusting wheel on the machine (not shown) which controls the number of degrees that the drive shaft will move in its clockwise rotation. The drive shaft 14 counterclockwise rotation always stops at the same position. As the righthand key 49 of engaging member 48 rises, it will pop into key way 54 in the drive shaft 14. Since the engaging member 48 is pivotally pinned to the drive disc 38, the drive disc 38 will be driven by the drive shaft 14 as the latter rotates in a clockwise rotation.

As previously described on the periphery of the drive disc 38, an engaging surface 40 of Fibertran fibers serves as a one-way clutch since the fibers are attached at an angle to the disc and will engage the slanted clutch teeth 44 of the feed rim 42. The teeth of the feed rim are slanted in such a direction as to effectively work against the Fibertran fibers. As the [counterclockwise] *clockwise* rotation of the drive disc 38, that is imparted by the drive shaft 14, is also imparted through the one-way clutch to the clutch teeth 44 of the feed rim 42, the outer feed rim 42, which is in engagement with the yarn, will be driven. Thus, during clockwise rotation, the drive disc 38 rotates and, as an example, for approximately 180° of machine time, delivers yarn off of the feed rim 42 into the yarn channel 58. For the first 120° of this approximate 180° rotation, the yarn comes off the feed rim 42 and into the yarn channel 58 until it reaches the prefeed and pullback storage pocket 94. The prefeed air channel 78 through this 120° of the cycle may be on to admit air through port 72 and through vertical port 86 of valve stem 84 which, at this time, will be aligned with prefeed air channel 78. Thus, the air from the prefeed air channel 78 drives the yarn into the prefeed and pullback storage pocket 94 to await the time when needles (See FIG. 11) are in position to accept the yarn. After [120°] *300°* machine time rotation in the clockwise rotation of drive shaft 14, the air port [62] *72* will be synchronized to close the prefeed system and at this time, the primary feed system will open as port 76 aligns itself with port 75 so that air will flow down through primary feed air channel 82 unimpeded by valve stem 84 since port 88 is aligned with the primary feed air channel 82. Air will thus pass over the Venturi-like nozzle 104 and through the yarn tube 102 to carry the yarn strand S which has been delivered into the prefeed and pullback storage pocket 94 causing the yarn strand S to feed through the yarn tube 102 to the tufting station (See FIG. 11). For the next 60° *(300°–360°)* of the machine time, the yarn feed wheel continues its feeding and the yarn continues through the yarn channel 58 as pulled by the air through primary feed channel 82 and into yarn feed tube 102.

Assume that this particular color yarn strand S is no longer required and it is necessary or desirable to change to another color from another unit. It is necessary to draw the yarn back from the common passageway (See FIG. 11) to permit the next strand to reach the tufting station. At this point in time, the solenoid is [de-energized] *not energized for the next cycle* and the tab 24 of the actuator 22 becomes ready to drop to its normal rest position, however, since it is still mechanically latched to the selector key 26 and since spring 34 is pushing the selector key 26 to the right, the latch condition is maintained. However, as selector shaft 12 rotates in a clockwise direction during its next cycle, it will push the selector key 26 to the left approximately a few thousandths of an inch to release the mechanical interference and allow the actuator tab 24 to drop. The spring 34 is now free to bias selector plunger 16, valve stem 84 and the cam plate 110 to the right, and as this occurs, the valve stem 84 reaches its furthest position to the right. The port 86, which was originally aligned with the prefeed air channel 78, now moves to the right and aligns itself with the pullback air channel 80. Also, the port 88 moves out of alignment with the primary feed air channel 82. As noted previously, the pullback chamber 68 is designed to receive air at all times and the oscillation of upper air valve plate 62 does not affect the flow of air because of the large size of air port 74. Thus, the pullback air flow is controlled totally by the movement of the valve stem 84 and when valve port 86 aligns with the pullback air channel 80, air flows there through causing the yarn strand S to be retracted through yarn tube 102 and withdrawn from the common throat area (See FIG. 11) as it is stored in the prefeed and pullback storage pocket 94.

Also, the movement to the right of cam plate 110 occurs after the solenoid 18 has been de-energized, and as this happens, when [feed rim 42 and] drive disc 38 [move] *moves* in a counterclockwise direction, the cam and lock arm 46 swings downwardly against the cam plate 110 along with the engaging member 48, the key of which 49 is still engaged in keyway 54. As the cam and lock arm 46 impacts against camming surface 112 of the cam plate 110, the cam plate 110 is forced to the left as the cam and lock arm 46 rides over the camming surface 112 and into the recessed area 114 to secure the cam plate 110 slightly to the left of this most rightward position. This effectively causes the port 86 of valve stem 84 to be slightly to the left of the pullback air channel 80, and the pullback air is accordingly turned off. As the lefthand end of the cam and lock arm 46 drops within the recessed area 114, the continued counterclockwise rotation of drive shaft 14 forces the engaging member 48 against release tab 116, thus, overcoming the bias of the key spring 52 and forcing the removal of the key 49 from the drive shaft keyway 54. Thus, the drive shaft 14 will continue to rotate, but without feeding yarn until the solenoid is once again energized.

With reference to FIG. 2, a modified pullback system is disclosed. In place of the pneumatic flow which impacts directly against the yarn strand S, a pneumatic piston-like plunger 118 is disclosed which physically drives the yarn into the prefeed and pullback storage pocket 94.

Figure 3:
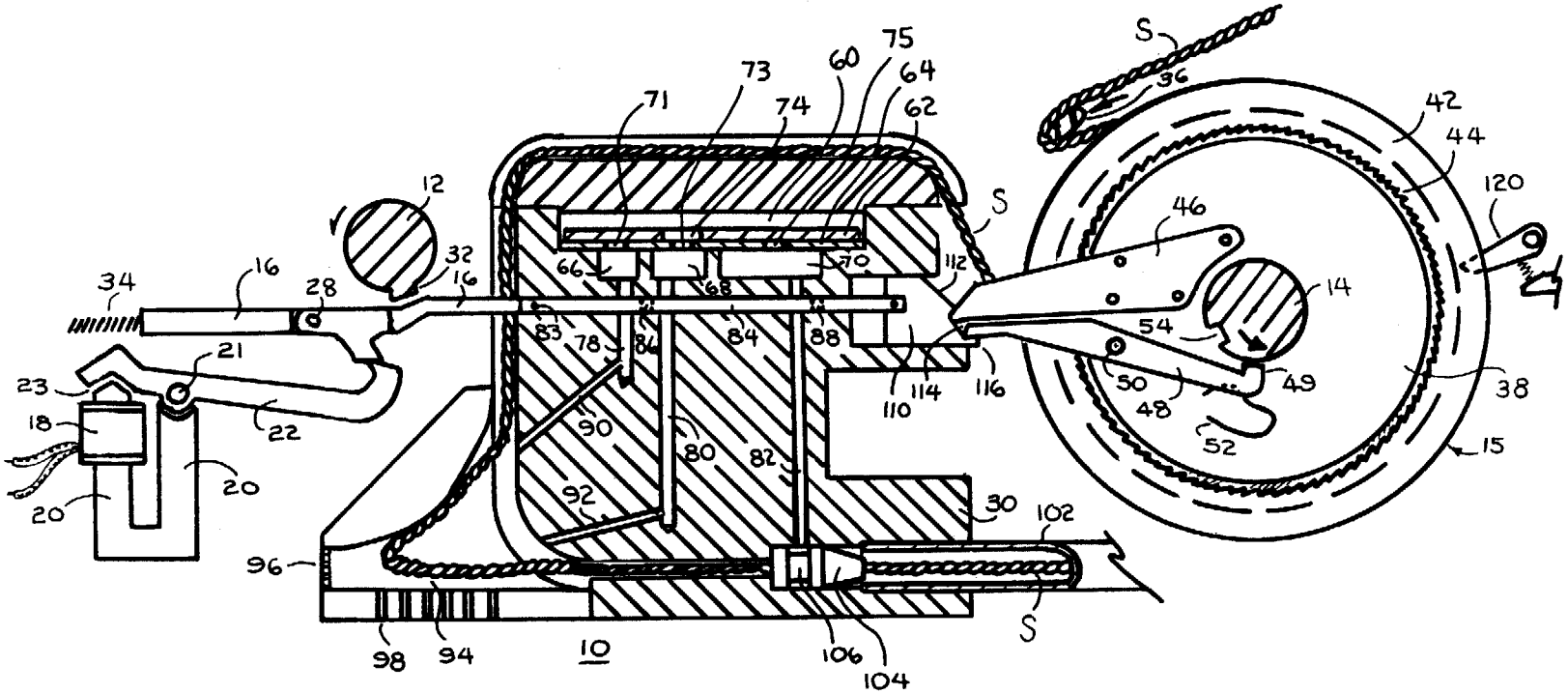
FIGS. 3 through 11 show sequential cross-section views depicting the operation of the yarn control and feeding apparatus of FIG. 1.

For a more detailed understanding of the subject invention, reference should be made to the sequential views shown in FIGS. 3 through 11. With reference to FIG. 3, the unit is in its standby or non-operating condition. The solenoid 18 is not being energized and the selector key 26 is in its standby position with everything being static except for the continual rocking motion of [the selector shaft 12 and] the drive shaft 14 and the airvalve plate 62. The yarn feed system is static. As can be seen at this time, yarn from the preceding cycle is stored in the prefeed and pullback storage pocket 94. A dog brake 120 not shown in previous FIGS. is shown which is spring loaded and which will keep the feed rim 42 from rotating where there is counterclockwise motion of the drive disc 38.

Figure 4:
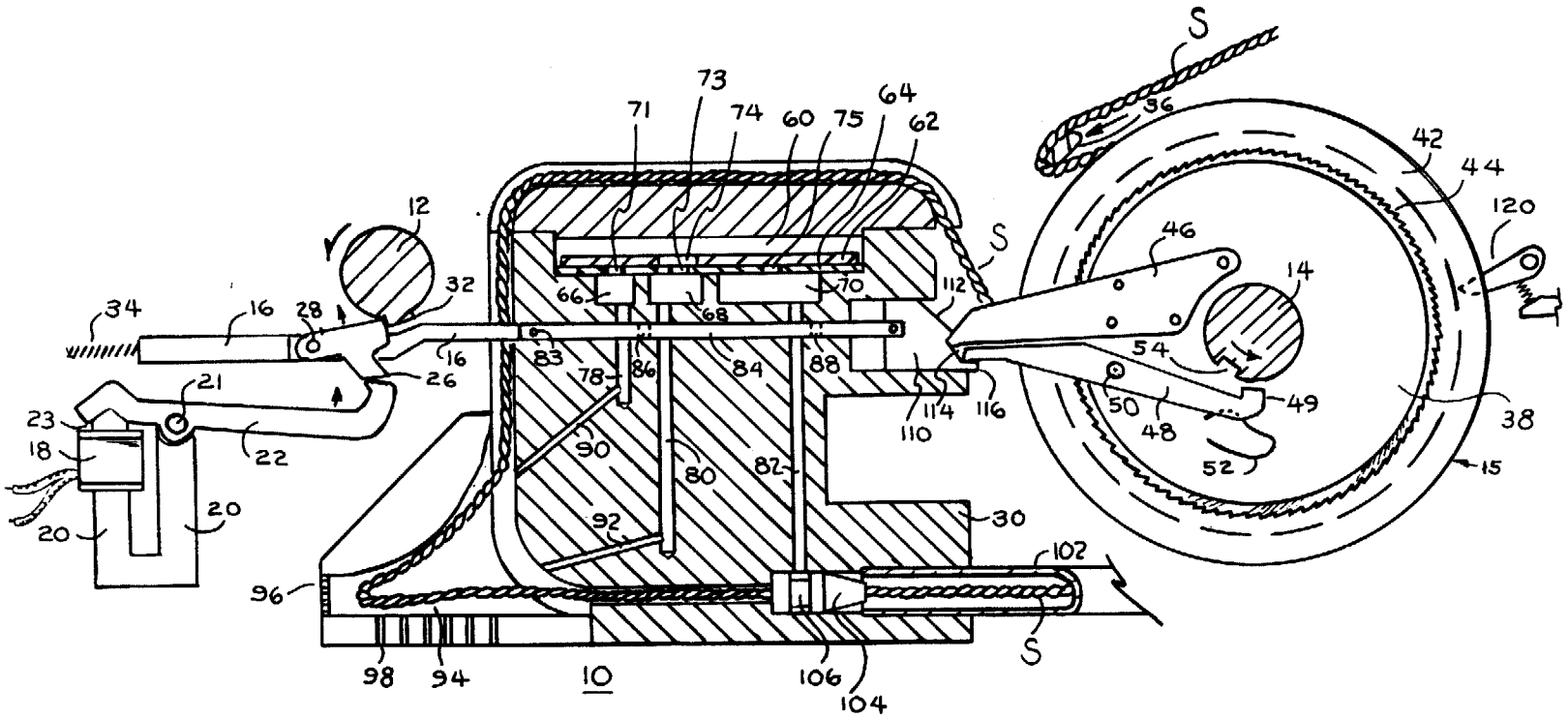

With reference to FIG. 4, the particular yarn of this unit is selected and the solenoid 18 is energized with a high voltage pulse. At this point, the drive shaft 14 [and the selector shaft 12 are] *is* shown going in *a* counterclockwise directions *and selector shaft 12 is to its counterclockwise extreme* as the solenoid 18 is energized with the tab 24 of actuator 22 moving upwardly to urge selector key 26 to its upward position. The air gap 23 has closed as this is achieved and the selection key 26 is now in its operating position.

Figure 5:
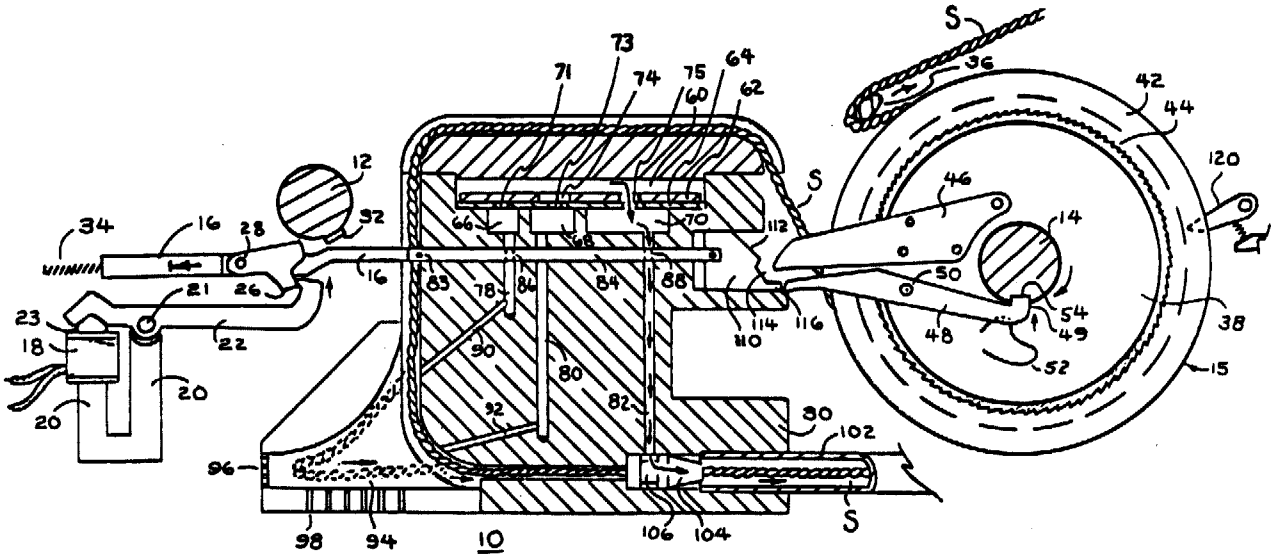

With reference to FIG. 5, the selector key 26 is shown in the up position and the selector shaft 12 [is rotating] *has rotated* clockwise and [engages] *engaged* selector key 26 to drive the selector plunger 16 to the left, which permits the selector key 26 to drop beside the actuator tab 24 causing mechanical hooking therebetween. *The selector shaft 12 has returned to its counterclockwise extreme position.* The leftward movement of cam plate 110 has permitted the cam and lock arm 46 to be released from recessed area 114 and permits the engaging member 48 to be clear of release tab 116, thus dropping at its lefthand end as the key spring 52 biases the key 49 into engagement with keyway 54. The drive shaft 14 has started in the clockwise direction and is, at this time, ready to feed yarn. The air from the pressure chamber is shown going down through the port 76 of upper air valve plate 62 through the chamber 70 and down through primary feed channel 82 as permitted by the alignment of port 88 with the primary feed channel 82. As this occurs, the yarn strand S is shown being advanced from its pullback position as temporarily stored in the prefeed and pullback storage pocket 94 through yarn tube 102.

Figure 6:
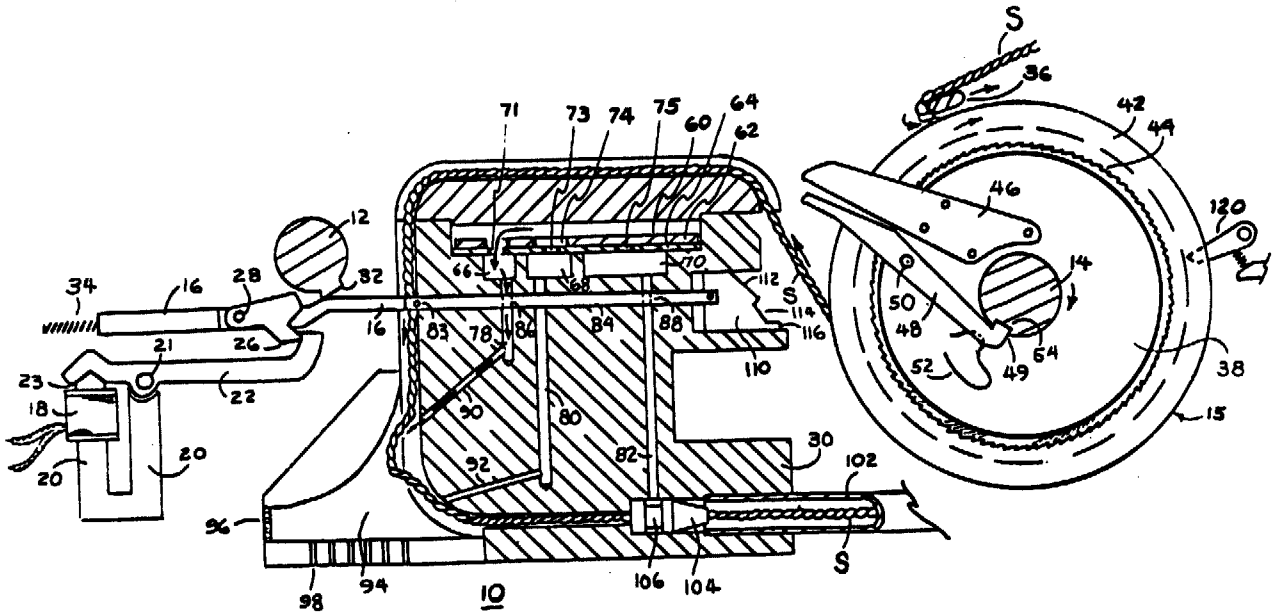

With reference to FIG. 6, the drive shaft 14 is shown continuing in its clockwise rotation as drive disc 38, engaging member 48, cam and lock arm 46 and feed rim 42 all rotate. The upper air valve plate 62 shifts and air flows through port 72 into chamber 66 and through aperture 86 into the prefeed channel 78. Yarn being delivered by the yarn feed wheel 15 is progressing down through the yarn guide channel 58 and is starting to be delivered into the prefeed and pullback storage pocket 94 as propelled by the air from the prefeed channel 78. At this point, the portion of the yarn strand S in the yarn tube 102 has no motion. The prefeed bar 36 starts shifting to the right. The selector shaft 12 [has started rocking] *remains* in the *extreme* counterclockwise [direction] *position*, again leaving the selector key 26 hooked on the actuator tab 24 in its leftward position.

Figure 7:
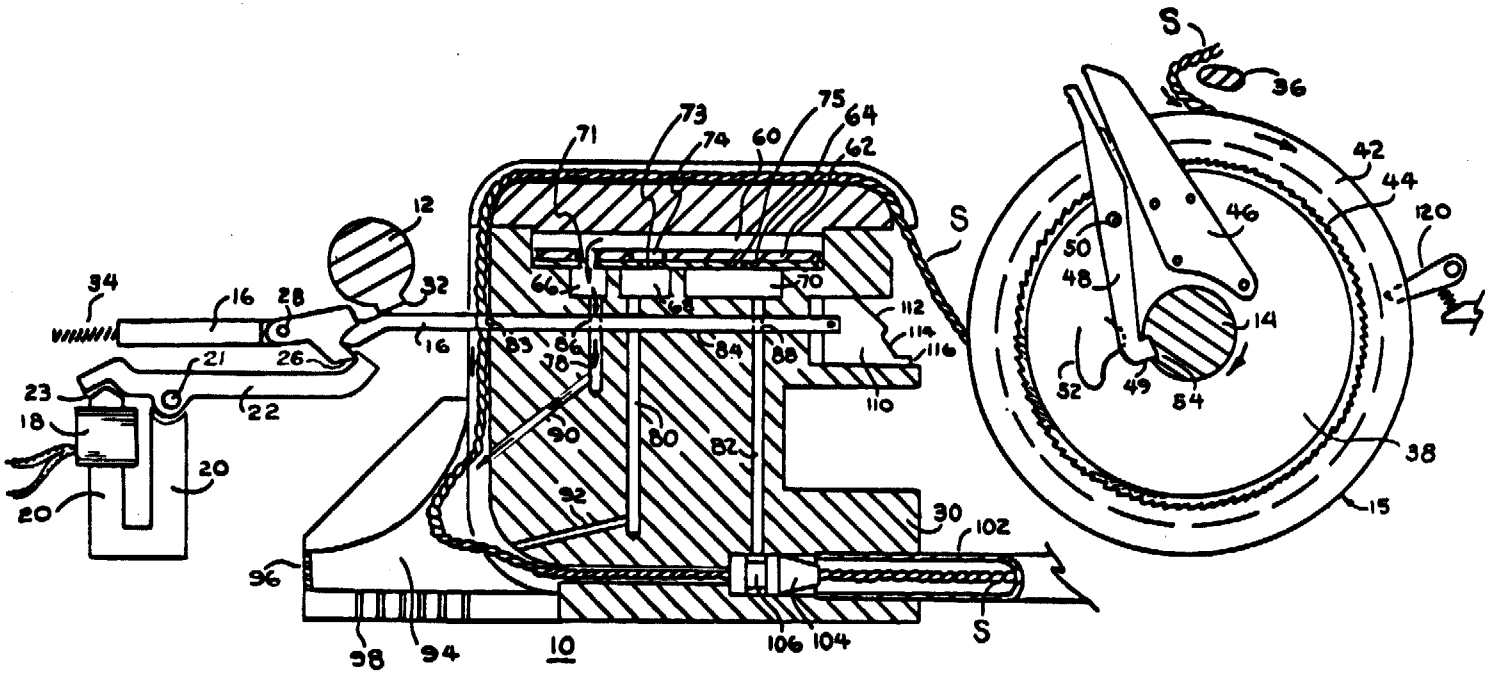

With reference to FIG. 7, the rotation of the yarn feed wheel 15 in its clockwise direction is shown as yarn delivery continues. The prefeed air from channel 78 is continuing to deliver the yarn to the prefeed and pullback storage pocket 94 and [the selector shaft 12 has again contacted] the selector key 26, [at which time] *is latched by tab 24* the solenoid 18 [goes] *having gone* off if that particular strand of yarn is no longer desired. If the solenoid 18 is programmed off, another solenoid in another unit for the same needle station will be programmed on before the yarn has been delivered to the needles on the previous selection. [As shown in FIG. 7, as the selector shaft 12 returns in the clockwise direction, it taps the selector key 26 relieving the pressure on it, thus allowing the actuator tab 24 to drop since the solenoid 18 is de-energized.]

Figure 8:
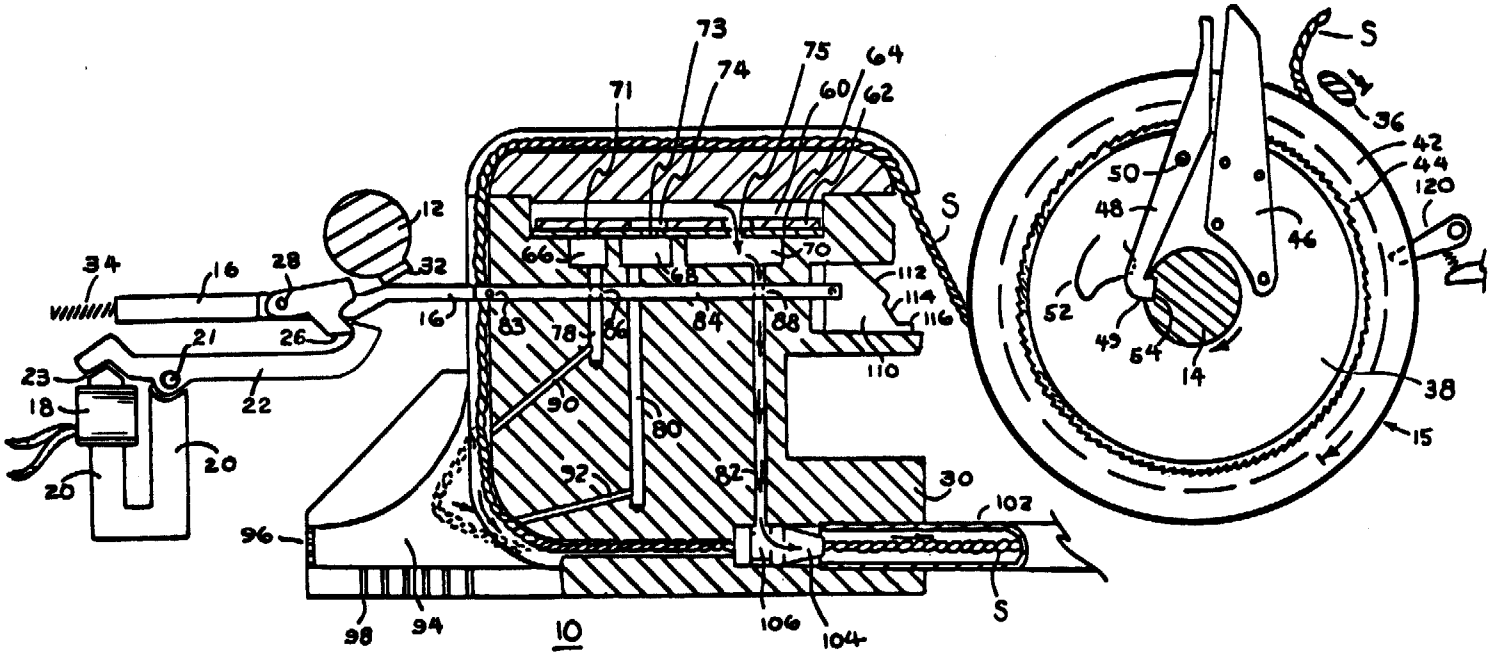

In FIG. 8, [the selector key 26 is still engaged by the selector shaft 12 and at this point,] the upper air valve plate 62 shifts again turning the primary feed air flow back on as previously. Since the clockwise rotation of the drive shaft 14 and the feed wheel 15 is continuing, the primary feed air flow is delivering prefed yarn which had been stored in the prefeed and pullback storage pocket 94 while continuing to feed yarn that is still being delivered by the feed wheel 15. During the last 60° of machine time, the yarn is delivered directly into the yarn tube 102 without going into the prefeed and pullback storage pocket 94.

Figure 9:
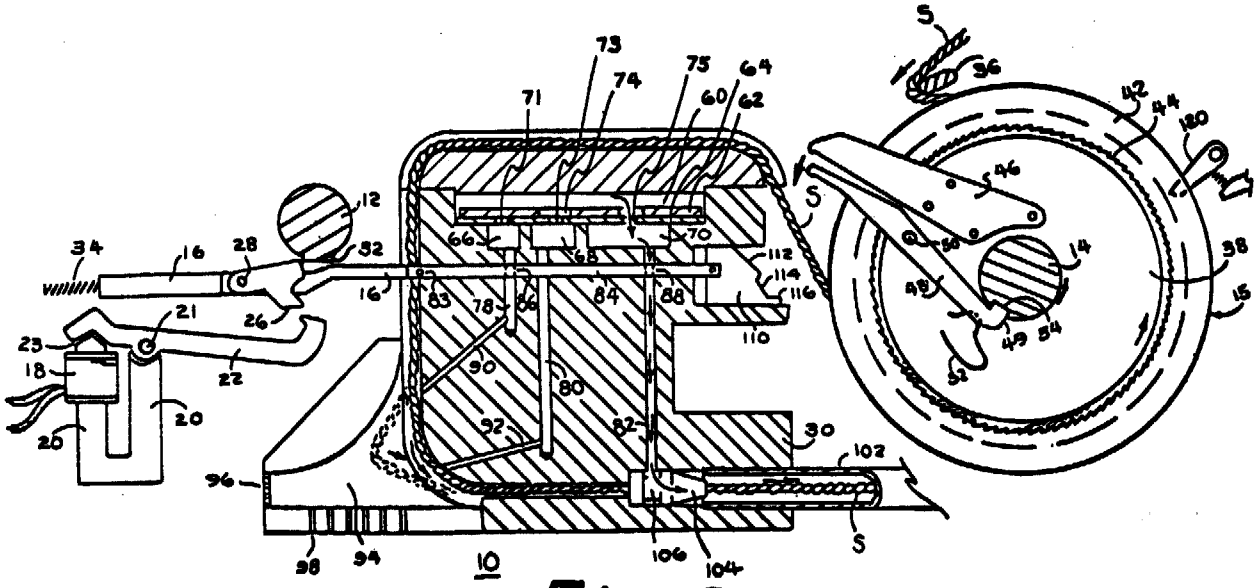

With reference to FIG. 9, [the rotation of the selector shaft 12 in its counerclockwise direction begins and after] *as the selector shaft 12 returns in the clockwise direction, it taps the selector key 26 relieving the pressure on it, thus allowing the actuator tab 24 to drop since the solenoid 18 is de-energized. After* the completed clockwise motion of the yarn feed wheel 15 is finished, the counterclockwise motion of the drive shaft 14 begins. [As can be seen, the] *The* counterclockwise rotation of the selector shaft 12 [allows] *will then allow* the selector key 26 and the selector plunger 16 to be biased to the right by spring 34. As this occurs, the valve stem 84 moves to the right and port 86 moves from the prefeed channel 78 to the pullback channel 80. Insofar as the tufting cycle is concerned at this time, severance of the yarn has been completed and once the pullback air is on, the yarn is pulled back through yarn tube 102 to clear the common throat area (See FIG. 11) adjacent the tufting station. The cam and lock arm 46 and the engaging member 48 are headed to their rest positions as the drive shaft 14 moves in a counterclockwise direction. The yarn prefeed bar 36 moves to the left and the spring biased dog brake 120, which is in engagement with the feed rim 42, prevents the counterclockwise rotation of the feed rim 42 as drive disc 38 rotates in a counterclockwise direction free of the influence of clutch teeth 44.

Figure 10:
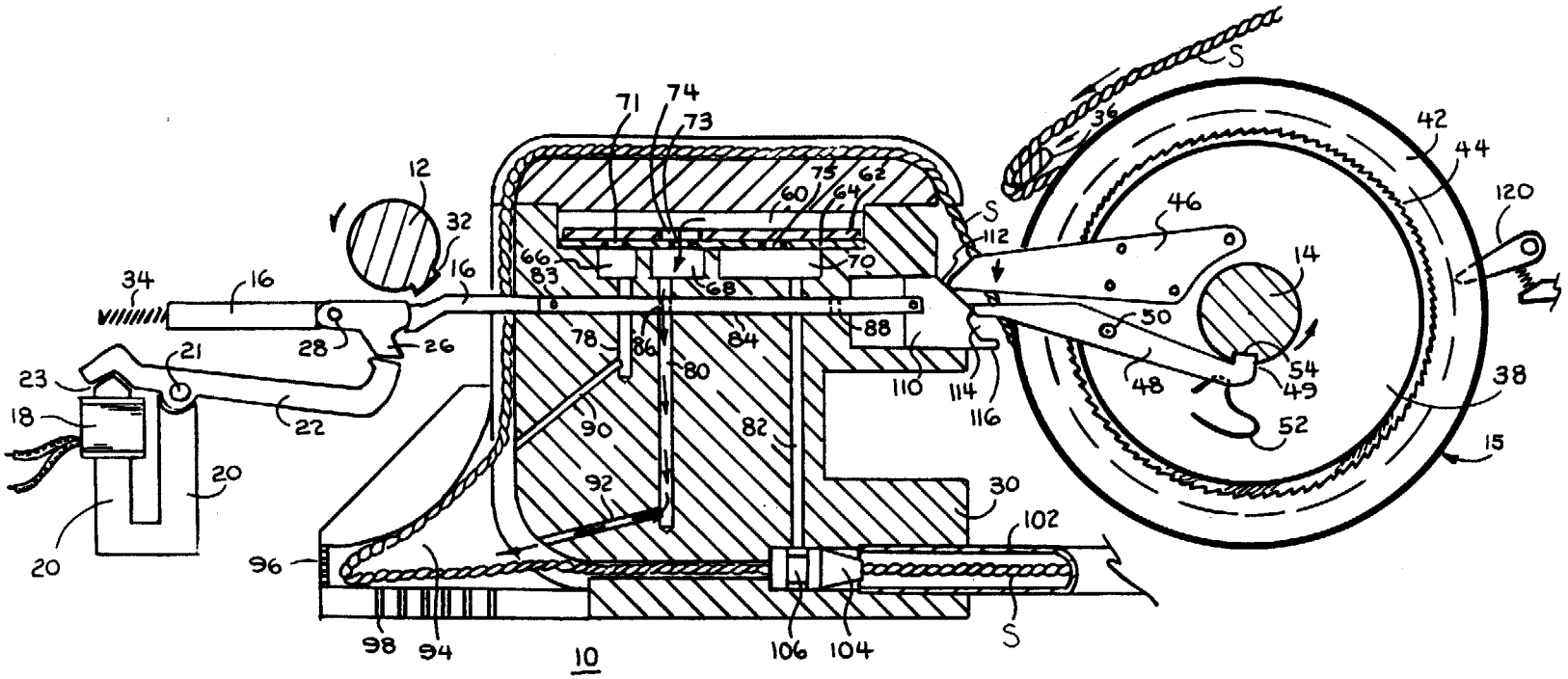

With reference to FIG. 10, the cam plate 110 is shown right before being engaged by the cam and lock arm 46 which will subsequently force the cam plate 110 back to its neutral or standby position. As shown in FIG. 10, at this moment, pullback air continues.

Figure 11:
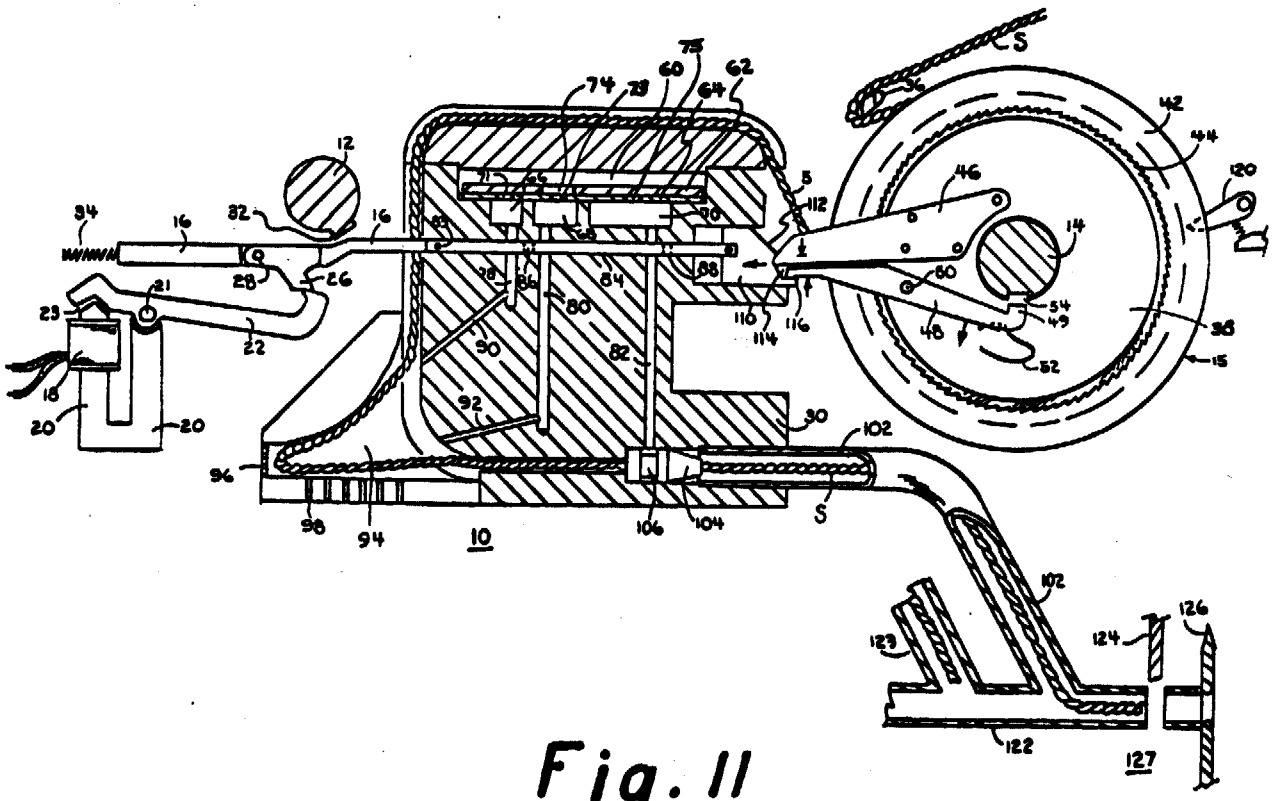

With reference to FIG. 11, the cam and lock arm 46 has pushed the cam plate 110 slightly to the left to its neutral position, thus sliding port 86 of valve stem 84 out of alignment with the pullback channel 80 to shut off the pullback air. The cam and lock arm 46 has caused the engaging member 48 to be pushed against selector release tab 116, as key 49 disengages with the keyway 54 of drive shaft 14, thus completing cycle.

Also shown in FIG. 11 are other elements which are common to some other embodiments of Spanel techniques as disclosed in Spanel patents and other copending applications. Yarn tube 102 is shown leading into common throat 122 along with a representative yarn tube 123, functionally the same as yarn tube 102, only extending from another selection unit. Severing means 124 and bit-applying elements, such as tufting needles 126, are schematically shown at tufting station 127 and it is to be understood that yarn strands once transported into common throat 122 are severed by severing means 124 and tufted into a backing layer by tufting needles 126.

Figure 12:
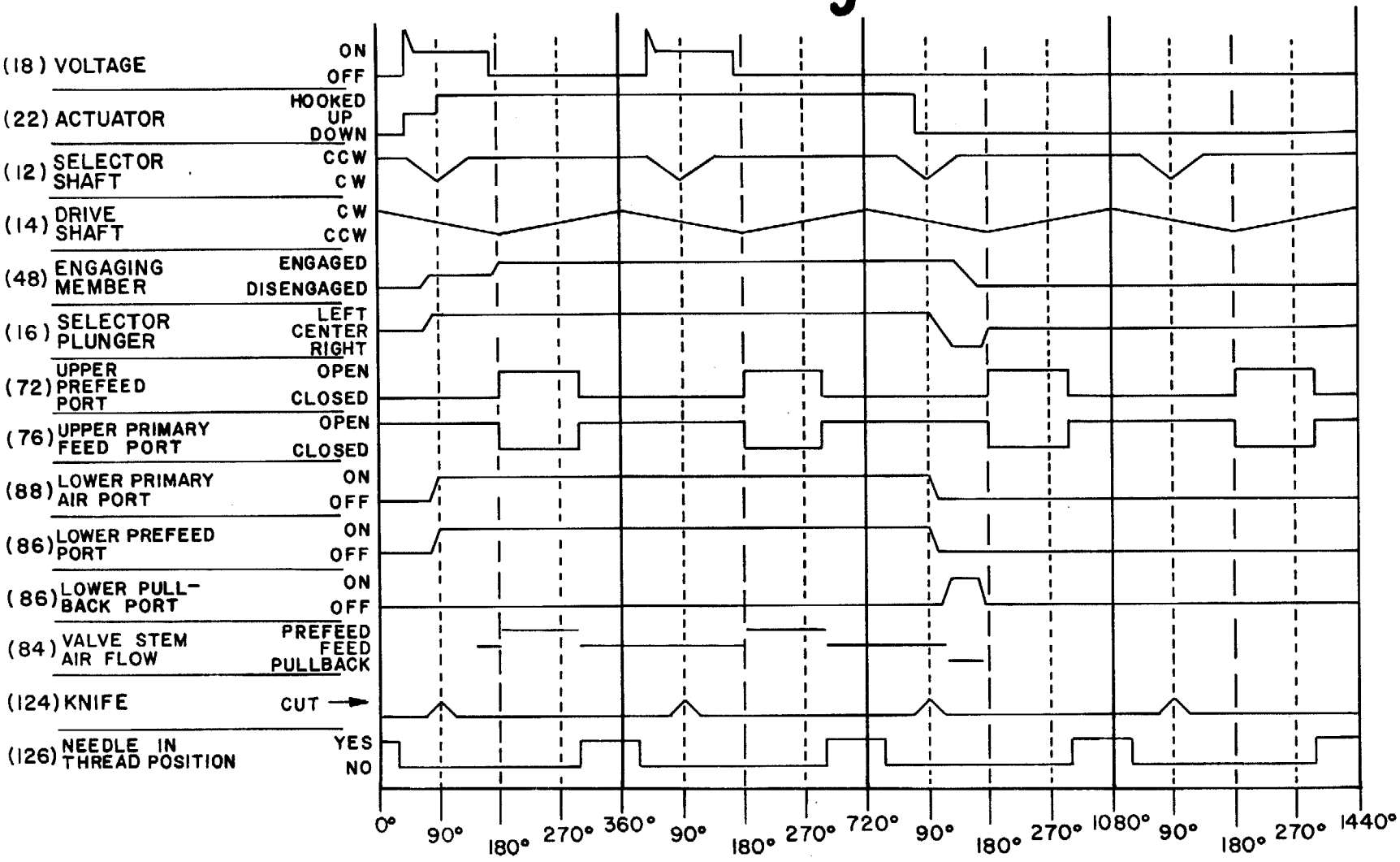
FIG. 12 discloses a representative timing diagram of the elements of the yarn control and feeding apparatus.

The timing diagram of FIG. 12 is essentially self-explanatory and shows representative periods of machine time cycles for the various elements that have been emphasized through the preceding discussion of the sequential views in FIGS. 3–11.

It is to be noted that the rotational distance of the drive shaft 14 can be adjusted to readily provide bit-lengths of yarn of different sizes. Also, it will be appreciated that the dimensions of the feed wheel 15 could be changed to adjust the bit-length sizes although such a change could not be made as readily as changing the rotational distance of drive shaft 14.

The present invention may be embodied in other specific forms without departing from the spirit or essential attributes thereof and, accordingly, reference should be made to the appended claims, rather than to the foregoing specification as indicating the scope of the invention.

We claim:

1. Tufting apparatus including bit-applying means for applying tufts to a backing layer at a tufting station comprising:

a metering means utilizing a controlled yarn feed means for advancing a yarn strand;

*a first* means including pulsed control means for [controlling] *actuating a second means to provide continued control of* the yarn feed means to feed a predetermined length of the yarn strand; and pneumatic yarn transporting means to advance the yarn strand to the tufting station.

2. The tufting apparatus of claim 1 wherein said pulsed control means also controls the pneumatic yarn transporting means.

3. The tufting apparatus of claim 1 wherein the yarn feed means comprises a rotatable yarn feed wheel which includes:

a drive shaft;

a drive disc rotatable with said drive shaft when engaged therewith by an intermediate member;

a feed rim disposed circumferentially around said drive disc and engageable with said drive disc by means of clutch means disposed therebetween whereby, upon engagement of said intermediate member with said drive shaft, said drive disc and said feed rim are rotated to feed and meter a length of yarn.

4. The tufting apparatus of claim 3 further including a plunger which, upon actuation from said pulsed control means, causes said intermediate member to engage said drive shaft to feed and meter a length of yarn.

5. The tufting apparatus of claim 1 wherein said yarn feed means is adjustable to feed and meter different size lengths of yarn.

6. The tufting apparatus of claim 1 wherein said pneumatic yarn transporting means includes means to advance and retract the yarn strand.

7. The tufting apparatus of claim 6 wherein said pneumatic yarn transporting means includes yarn feed tubes and a yarn pocket for storage of retracted yarn.

8. The tufting apparatus of claim 7 wherein the means to advance and retract the yarn strand comprises a first air feed channel for supplying air to advance yarn and a second air feed channel for supplying air to retract yarn with said second air channel being positioned to expel air into said pocket.

9. The tufting apparatus of claim 8 further including a third air feed channel for supplying air to advance yarn to said pocket, said third air feed channel also being positioned to expel air into said pocket.

10. The tufting apparatus of claim 6 wherein said means to advance the yarn strand comprises two pneumatic channels which provide air flow at two positions during the advancement of the yarn strand.

11. The tufting apparatus of claim 1 wherein said means for controlling the yarn feed means includes a slideable member having ports therethrough and said pneumatic yarn transporting means includes air channels which are bisected by said slideable member with said ports providing air valve means to permit air flow through said air channels.

12. The tufting apparatus of claim 1 wherein said pulsed control means includes a magnetic core, a solenoid carried by said core, an actuator positioned to be responsive to the energization of said solenoid, and a selector key positioned to be actuated by said actuator to control the yarn feed means upon actuation, said selector key also being positioned to link mechanically to said actuator after actuation whereby said solenoid can be provided with a high voltage pulse initially while having low voltage demands after said mechanical linking of said selector key and actuator.

13. The tufting apparatus of claim 12 wherein said means for controlling the yarn feed means comprising a selector shaft having a cam lobe, said selector shaft being oscillatory and said cam lobe being positioned to engage said selector key upon actuation of selector key whereby drive forces of said selector shaft are imparted to said selector key.

14. The tufting apparatus of claim 13 wherein said selector key is pivotally secured to a selector plunger and wherein said supply system further comprises a valve stem rigidly secured to said selector plunger, said valve stem being positioned to control said pneumatic yarn transporting means; and a cam plate rigidly secured to said valve stem and positioned to control said yarn feed means.

15. Tufting apparatus including bit-applying means for applying tufts to a backing layer comprising:

a metering means utilizing a controlled rotatable yarn feed means for advancing a yarn strand;

means for controlling the rotatable yarn feed means to feed a predetermined length of the yarn strand; and pneumatic yarn transport means including valvable feed means and valvable pullback means.

16. The tufting apparatus of claim 15 wherein said valvable pullback means including a piston member which is pneumatically driven to impact against the yarn strand.

17. A tufting machine comprising:

a yarn source;

a yarn metering and feeding means;

a yarn pullback means which enables yarn previously fed to be returned to a standby position, said pullback means being pneumatically actuated;

a pneumatic yarn transport means;

control means for actuating said yarn metering and feeding means, said yarn pullback means, and said pneumatic transport means;

yarn severing means; and tufting elements to tuft said severed yarn.

18. The tufting machine of claim 17 wherein said control means comprises a solenoid;

an actuator responsive to said solenoid; and a selector key actuable upon impact by said actuator and positioned to form a mechanical link with said actuator upon actuation.

19. The control means of claim 18 wherein said solenoid, said actuator, and said selector key are operable to control said yarn metering and feeding means, said yarn pullback means, and said pneumatic transport means by receiving a high voltage pulse initially followed by a lower voltage supply after the mechanical linking of said selector key and said actuator.

20. A tufting machine comprising:

a yarn source;

a yarn metering and feeding means;

a yarn pullback means which enables yarn previously fed to be returned to a standby position;

a pneumatic yarn transport means;

pulsed control means for actuating *means to control* said yarn metering and feeding means, said yarn pullback means, and said pneumatic transport means;

yarn severing means; and tufting elements to tuft said severed yarn.

21. The tufting machine of claim 20 wherein said pneumatic transport means includes a yarn tube for transporting yarn to said tufting elements, a prefeed air source, and a primary feed air source, and wherein said yarn pullback means includes a pullback air source, said tufting machine further comprising a prefeed and pullback storage pocket wherein air from the prefeed source and air from the pullback source are directed to guide yarn into the prefeed and pullback storage pocket at designated times during the operation of said tufting machine.

22. The tufting machine of claim 20 wherein said yarn metering and feeding means includes a rotatable yarn feed wheel, said rotatable yarn feed wheel including a drive shaft, a drive disc mounted on said drive shaft, a feed rim for conveying yarn circumferentially disposed around said drive disc, and engageable by said drive disc to advance yarn from said yarn source, and further including an intermediate engaging member whereby motion of said drive shaft is imparted to said drive disc to rotate said drive disc and said feed rim, thereby advancing said yarn.

23. The tufting machine of claim 20 wherein said control means comprises a selection plunger which actuates said yarn metering and feeding means and said pneumatic transport means and said yarn pullback means.

24. The tufting machine of claim 23 wherein said yarn metering and feeding means includes a rotatable yarn feed wheel which is actuable by an engaging member; and wherein said selection plunger is rigidly secured to a cam plate, said plate being positioned to actuate said engaging member.

* * * * *